United States Patent [19]

Lungu

[11] 4,388,575

[45] Jun. 14, 1983

[54] ARRANGEMENT FOR CONTROLLING ELEMENTS OF POWER VEHICLE SUCH AS SAFETY BELT, WINDOW PANE AND THE LIKE

[75] Inventor: Corneliu Lungu, Bühlertal, Fed. Rep. of Germany

[73] Assignee: Robert Bosch GmbH, Stuttgart, Fed. Rep. of Germany

[21] Appl. No.: 344,778

[22] Filed: Feb. 1, 1982

[30] Foreign Application Priority Data

Mar. 26, 1981 [DE] Fed. Rep. of Germany ....... 3111919

[51] Int. Cl.³ .............................................. G05B 5/00
[52] U.S. Cl. ................................... 318/475; 318/467; 318/476; 318/434
[58] Field of Search ............... 318/467, 475, 476, 434; 200/61.39; 49/26, 27, 28, 72

[56] References Cited

U.S. PATENT DOCUMENTS

| | | | |
|---|---|---|---|
| 1,864,048 | 6/1932 | McNutt | 49/28 X |
| 2,329,280 | 9/1943 | Lunken et al. | 318/475 X |
| 2,763,797 | 9/1956 | Dean | 318/475 X |
| 2,817,512 | 12/1957 | Christen | 49/26 |
| 2,954,224 | 9/1960 | Schneider et al. | 49/28 X |
| 3,403,474 | 10/1968 | Spasoff | 49/28 X |

*Primary Examiner*—Ulysses Weldon
*Attorney, Agent, or Firm*—Michael J. Striker

[57] ABSTRACT

An arrangement for controlling an element of a power vehicle, such as a safety belt, window pane, and the like, has a displaceable member connectable with a power vehicle element to be controlled and displaceable together with the latter from a first end position to a second end position in a predetermined direction, a drive unit for driving the displaceable member, and a safety device arranged to interrupt a power flux to the displaceable member when a resistance acts upon the latter in a direction opposite to the first-mentioned direction with exceeding of a predetermined limiting value, wherein the safety device includes a safety member arranged withdrawable between the drive unit and the displaceable member and retained in the power flux by a force adjustable in correspondence with the limiting value.

8 Claims, 1 Drawing Figure

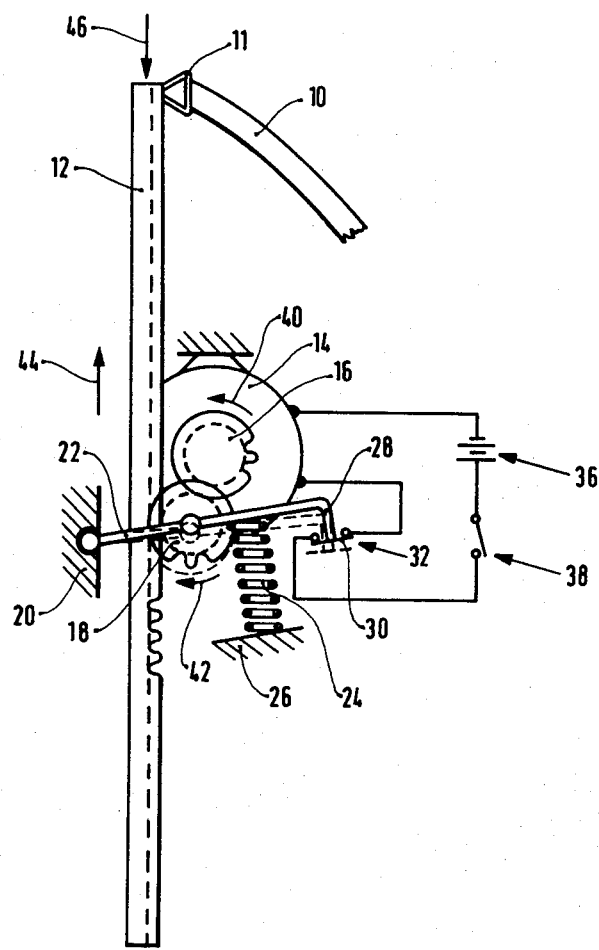

ARRANGEMENT FOR CONTROLLING ELEMENTS OF POWER VEHICLE SUCH AS SAFETY BELT, WINDOW PANE AND THE LIKE

BACKGROUND OF THE INVENTION

The present invention relates to an arrangement for controlling an element of a power vehicle, such as a safety belt, a window pane and the like.

Arrangements of the above-mentioned general type are known in the art. A known arrangement has a hose arranged on a frame of a window pane and filled with balls composed of an elastically conductive material. The hose is located in an electric circuit of an electric drive motor. During closing the window an object gets between the closing edge and the pane, the balls are pressed from one another so that the electric circuit of the drive motor is interrupted and the motor is turned off. The known arrangement occupies, however, a considerable space and its responsiveness depends on the elasticity of the hose and is thereby not adjustable.

SUMMARY OF THE INVENTION

Accordingly, it is an object of the present invention to provide an arrangement for controlling a power vehicle element, such as a safety belt, a window pane and the like, which avoids the disadvantages of the prior art.

More particularly, it is an object of the present invention to provide an arrangement for controlling an element of a power vehicle, such as a safety belt, a window pane and the like, which has such safety means that the limiting value to which the safety means responds can be adjusted in accordance with the respective requirements.

It is also an object of the present invention to provide an arrangement of the above-mentioned type in which the safety means is very compact and not susceptible to outer influence.

In keeping with these objects and with others which will become apparent hereinafter, one feature of the present invention resides, briefly stated, in an arrangement for controlling an element of a power vehicle, such as a safety belt, a window pane and the like, in which safety means includes a withdrawable safety member located in a power flux between a drive motor and a displaceable member connectable with a power vehicle element to be controlled, wherein the safety member is retained in the power flux by a force adjustable in correspondence with a limiting value. When the arrangement is designed in accordance with the present invention, it provides for the above-mentioned highly advantageous results.

In accordance with another feature of the present invention, the displaceable member is formed as a toothed rack, and the withdrawable safety member is formed as a withdrawable toothed wheel engageable with the toothed rack.

Still another feature of the present invention is that the drive means is connected with a driven pinion, and the withdrawable toothed wheel is engageable with the driven pinion.

In accordance with a further feature of the present invention the withdrawable toothed wheel is guided and spring loaded. The spring loading can be carried out by spring conveyors. The guiding can be carried out by a pivotable lever connectable with the withdrawable toothed wheel for a joined pivoting therewith.

Still a further feature of the present invention is that the pivotable lever is arranged and spring loaded in such a manner that the withdrawable toothed wheel connected with the pivotable lever is retained in engagement with the toothed rack and the driven pinion.

Finally, the drive means is formed as electrical drive means, and the pivotable lever may be operatively connected with a switch member of a switch arranged in the electric circuit of the electric drive means.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a view showing an arrangement for controlling a power vehicle element, such as a safety belt, a window pane and the like, in accordance with the present invention.

DESCRIPTION OF A PREFERRED EMBODIMENT

An arrangement shown in the drawing is an arrangement for controlling a safety belt 10 in a passenger compartment of a power vehicle.

The safety belt 10 is connected by its ear 11 with a displaceable member formed as a toothed rack 12. The toothed rack 12 is displaceable in its longitudinal direction from a drive unit 14 having an electric motor, via a pinion 16 driven by the drive unit, and via a toothed wheel 18 engageable with the pinion 16. The safety belt 10 is brought with the aid of the above-described drive and transmission from one end position to another end position. Both end positions form the loose position of the safety belt 10 on the one hand, and the abutting or operative position of the safety belt 10 on the other hand. The toothed wheel 18 is supported on a pivotable lever 22 which is pivotally arranged on a fixed member 20. More particularly, the toothed wheel 18 is arranged on the pivotable lever 22 so that it engages with the pinion 16, on the one hand, and the toothed rack 12, on the other hand. The arrangement of the pivotable lever 22 is so selected that the toothed wheel 18 can be withdrawn, by pivoting the pivotable lever 22, from engagement with the teeth of the pinion 16.

The pivotable lever 22 is loaded with a force of a pressure spring 24 which retains the toothed wheel 18 in engagement with the pinion 16. The pressure spring 24 abuts against a fixed member 26. The toothed wheel 18 is guided and spring loaded.

The tiltable lever 22 has at its free end a bend 28 cooperating with a switch member 30 which belongs to a switch 32. The switch 32 is arranged in an electric circuit in which a current source 36 and operating switch 38 are provided. The operating switch 38 is formed in conventional manner as a change-over switch so that the pinion 16 can be selectively driven in both directions.

In operation of the arrangement, when the operating switch 38 is closed, the pinion 16 is driven in direction of the arrow 40. The toothed wheel 18 rotates thereby in direction of the arrow 42, and the toothed rack 12 displaces in direction of the arrow 44. The safety belt 10 is transferred from its operating position to its loose position. When during the control movement hinderance to the toothed rack takes place, for example because of clamping a body part between the ear 11 and a body of the power vehicle, the toothed wheel 18 because of the resistance indicated by the arrow 46, on the one hand, and the drive force of the pinion 16, on the other hand, is pressed with the pivotable lever 22 against the force of the pressure spring 24 from its operating position shown in the drawing. Thus, the switch member 30 opens the switch 32. The lever 22 and the switch member 30 are in the position shown in dashed lines until the source of the hinderance is eliminated. It is clear that the lever 22 together with the switch member 30 of the switch 32 form a safety device which interrupts the power flux between the drive unit 14 and the power vehicle element to be controlled when the limiting value adjusted by the force of the spring 24 is exceeded. It can also be easily seen that by special adjustment of the holding force of the spring 24, the above-mentioned limiting value can be brought in correspondence with the respective requirements.

The toothed rack 12 of the control arrangement is arranged, for example, in the frame of the vehicle door so that only the gear 11 engages through a slot in the vehicle door.

A simplified construction of the inventive arrangement is favorable when the pressure spring is so designed that in the event of loosening of the safety means, the toothed wheel 18 moves against the force of the pressure spring 24 out of engagement with the pinion 16. In this case the above-described cooperation of the pivotable lever 22 with the switch member 30 of the switch 32 can be dispensed with.

It will be understood that each of the elements described above, or two or more together, may also find a useful application in other types of constructions differing from the types described above.

While the invention has been illustrated and described as embodied in an arrangement for controlling elements of power vehicle such as safety belt, window pane, and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims:

1. An arrangement for controlling an equipment part of a power vehicle, comprising a displaceable member connectable with a power vehicle element to be controlled and displaceable together with the latter from a first end position to a second end position in a predetermined direction; means for driving said displaceable member; and safety means arranged to interrupt a power flux from said driving means to said displaceable member when a resistance beyond a limiting value acts upon said displaceable member in a direction opposite to said predetermined direction, said safety means including a withdrawable toothed wheel connected with a lever pivotable so that in the event of a resistance beyond the limiting value said toothed wheel is withdrawable from the power flux and thereby the displacement of said displaceable member is interrupted, whereas in the event of a resistance within the limiting value said toothed wheel is retained in the power flux by a force adjustable in correspondence with the limiting value and thereby the displacement of said displaceable member is sustained; and means for retaining said toothed wheel in the power flux by a force adjustable in correspondence with the limiting value.

2. An arrangement as defined in claim 1, wherein said displaceable member is formed as a toothed rack, said withdrawable toothed wheel being engageable with said toothed rack.

3. An arrangement as defined in claim 2, wherein said drive means includes a driven pinion, said withdrawable toothed wheel being engageable with said driven pinion.

4. An arrangement as defined in claim 2, wherein said retaining means is means for spring-loading said toothed wheel.

5. An arrangement as defined in claim 1, wherein said retaining means is means for spring-loading said pivotable lever, said drive means including a driven pinion, said displaceable member being formed as a toothed rack, said pivotable lever being so arranged and spring-loaded that said withdrawable toothed wheel connected with said pivotable lever is retained in engagement with said toothed rack and said driven pinion in the event of a resistance within the limiting value.

6. An arrangement as defined in claim 1, wherein said drive means is formed as electrical drive means having an electric circuit; and further comprising a switch arranged in said electric circuit of said electrical drive means and having a switch member with which said pivotable lever is operatively connected.

7. An arrangement as defined in claim 1, wherein said electrical drive means includes an electric motor.

8. An arrangement for controlling an equipment part of a power vehicle, comprising a displaceable member connectable with a power vehicle element to be controlled and displaceable together with the latter from a first end position to a second end position in a predetermined direction, said displaceable member being formed as a toothed rack; means for driving said displaceable member and including a driven pinion; and safety means arranged to interrupt a power flux from said driving means to said displaceable member when a resistance beyond a limiting value acts upon said displaceable member in a direction opposite to said predetermined direction, said safety means including a withdrawable toothed wheel arranged so that in the event of a resistance beyond the limiting value said toothed wheel is withdrawable from the power flux and thereby the displacement of said displaceable member is interrupted, whereas in the event of a resistance within the limiting value said toothed wheel is retained in the power flux by a force adjustable in correspondence with the limiting value and thereby the displacement of said displaceable member is sustained, said toothed wheel being engageable with said toothed rack and said driven pinion; and means for retaining said toothed wheel in the power flux by a force adjustable in correspondence with the limiting value.

* * * * *